United States Patent [19]

Iorns et al.

[11] Patent Number: 4,994,638
[45] Date of Patent: Feb. 19, 1991

[54] THERMALLY INSULATIVE AND SHOCK RESISTANT FOOD PACKAGING

[75] Inventors: David S. Iorns, Workington; David S. Bruce, Whitehaven, both of United Kingdom; Hans-Joachim Biskup, Kempten; Erhard Scheibel, Wolfertschwenden, both of Fed. Rep. of Germany

[73] Assignee: Smith Brothers (Whitehaven) Limited, Whitehaven, United Kingdom

[21] Appl. No.: 159,712

[22] Filed: Feb. 24, 1988

[30] Foreign Application Priority Data

Feb. 24, 1987 [DE] Fed. Rep. of Germany ....... 8704322
Oct. 16, 1987 [DE] Fed. Rep. of Germany ....... 8724331
Nov. 20, 1987 [DE] Fed. Rep. of Germany ....... 3739432

[51] Int. Cl.$^5$ .............................................. H05B 6/80
[52] U.S. Cl. .............................. 219/10.55 E; 426/113; 426/234; 426/241; 206/564
[58] Field of Search .................. 219/10.55 E, 10.55 F, 219/10.55 R, 10.67; 426/107, 113, 243, 234, 241, 110, 111, 112, 114; 206/558, 564; 220/23.6, 22; 99/DIG. 14

[56] References Cited

U.S. PATENT DOCUMENTS

| | | | |
|---|---|---|---|
| 2,218,724 | 10/1940 | Rudd | 206/558 |
| 3,287,140 | 11/1966 | Brussell | 426/113 X |
| 3,979,572 | 9/1976 | Ito et al. | 219/10.67 X |
| 3,997,677 | 12/1976 | Hirsch et al. | 426/113 X |
| 4,210,674 | 7/1980 | Mitchell | 426/107 |
| 4,478,349 | 10/1984 | Haverland, Jr. et al. | 219/10.55 E X |
| 4,486,640 | 12/1984 | Bowen et al. | 219/10.55 E |
| 4,701,585 | 10/1987 | Stewart | 219/10.55 E |

Primary Examiner—Philip H. Leung
Attorney, Agent, or Firm—Fulwider, Patton, Reiber, Lee & Utecht

[57] ABSTRACT

A self-supporting tray-like product container (especially for food) having an inner dished part for accommodating the product in a first well, and an outer dished part having a second well into which the first well protrudes, the inner and outer parts contacting and being joined to each other at their respective peripheral edges otherwise with their wells in all-round mutually-spaced relation. The spacing provides thermal and/or shock insulation and allows the inner and outer parts to be made of different materials especially one having different thermal deformation resistances which allows use of the package in either a conventional or a microwave oven or both according to the materials chosen.

10 Claims, 2 Drawing Sheets

THERMALLY INSULATIVE AND SHOCK RESISTANT FOOD PACKAGING

The present invention relates to packaging, and has application to self-supporting product containers, often of tray-like type.

Increasing attention is being paid to the packaging of food products for sale to consumers to ensure that the food reaches the consumer in the best possible condition. That has led to vacuum packing, and more recently to controlled or modified atmosphere packaging. There is also an increasing demand for such packaged food to be supplied in self-supporting tray-like containers in which the food can be heated-up or cooked in either of conventional or microwave ovens. Clearly, materials used should not of themselves or otherwise lead to contamination of food products therein. Also, materials which exhibit suitable physical rigidity and thermal stability tend to be difficult for conventional differential-pressure thermoforming, and often do not provide sufficient barrier, at least for controlled or modified atmosphere packaging. Accordingly, producing containers which meet all the desired requirements is particularly difficult at reasonable cost, if not impossible. The present invention aims, at least in some preferred embodiments, to help overcome the above mentioned difficulties for food packaging.

In packaging in general, not necessarily limited to food products, there is often a requirement for affording shock or impact resistance and/or vibration protection, and embodiments of the invention can be useful to that end.

According to one aspect of the present invention there is provided a self-supporting preferably tray-like product container comprising an inner dished part formed with a peripheral edge portion thereabout and a first well receiving said product, and an outer dished part formed with a peripheral edge portion thereabout and a second well into which said first well is entrant, the inner and outer parts contacting and being joined to each other at their respective peripheral edge portions, otherwise with their wells in all-round mutually-spaced relation.

Useful thermal and/or shock or impact insulation can result from that spaced relation with an insulating/cushioning fluid, usually a gas at or near normal atmospheric pressure and often with air, between the inner and outer parts, which can be of different materials contributing also to economy of manufacture. Preferably, the peripheral edge portions of the inner and outer parts, which may be as flanges, lips or abutment surfaces, are joined together by a continuous seal thereabout.

According to another aspect of this invention, there is provided a method of producing a self-supporting product container, comprising the steps of forming a first part having a peripheral edge portion thereabout and a product-receiving well, forming a second part having a peripheral edge portion thereabout and a well accommodating the product-receiving well in all-round mutually-spaced relation, and uniting the first and second parts at their peripheral edge portions with the first part inner and the second part outer relative to the container as a whole, preferably with an insulating/cushioning fluid therebetween.

According to a further aspect of this invention, there is provided apparatus for making self-supporting product containers, comprising means for forming first and second parts each with peripheral edge portions thereabout and receiving wells, the receiving well of the first part being for product and the receiving well of the second part accommodating the product-receiving well of the first part in all-round mutually-spaced relation, and means for joining the first and second parts at their peripheral edge portions, preferably with an insulating/cushioning fluid therebetween.

The inner and outer parts can be made, say by differential-pressure-aided thermoforming of sheet materials, as open-top containers or trays, each having a base and upstanding side walls extending therefrom and out-turned to form respective peripheral flanging. Forming may be done separately and the parts brought together afterwards, or substantially simultaneously and oppositely with the well of the inner part then inverted into the well of the other part.

Using different materials, the outer part can be of a relatively inexpensive material mainly to provide desired physical properties, including rigidty of the container, even as a board or paper-based material, whilst the inner skin is of a non-contaminating barrier material, e.g. in allowing a controlled/modified atmosphere to be established in the head space above a food product. Thermal deformation resistances can be different, whether for microwaving requiring higher such resistance (say 120 degrees C.) for the inner part than for the outer part (say 50 to 60 degrees C.), or for conventional oven cooking requiring higher such resistance for the outer part (say 200–220 degrees C.) than for the inner part (say 120 degrees C.).

Physically strong and rigid outer parts allow inner parts to be of flexible material. However, the opposite is feasible, say for conventional oven use, i.e. where the inner part is physically supporting and the outer part is physically weaker, even flexible, but of high thermal distortion resistance as applies to polycarbonate. Generally, thickness of material of each part can be kept to a sensible minimum, also reducing costs. Clearly, flexibility of either part can contribute to shock/impact/vibration resistance.

There will normally be a cover for a product container hereof, generally extending over its inner part, conveniently sealed thereto, often preferably continuously about the container.

Such cover may be of sheet, say a web or film, and cooperation with the inner part can give close restraint of product then effectively trapped as well as suspended by the inner part in the outer part. An alternative is to use two uncovered containers hereof in confronting relation. Suitable connection or securement can include hinging together at effectively common edge portions.

The inner and outer parts can be fused or sealed together at the same time as a cover web is applied. Where a controlled or modified atmosphere is called for, a suitably impermeable material will be used for the cover web. It may be advantageous, at least for food products, if the cover web has a peelable fixing to the inner part, say for "cook-in" packs to allow opening up a corner, for escape of steam during cooking, and/or for easy removal after cooking. Seal strength can also provide a safety mechanism, by breaking if excessive pressure builds up in unpunctured packs.

Peeling of a cover web can be aided if loose at a corner of the pack whereat inner and outer parts are sealed together. Cutting or heavy scoring of the inner and outer parts, at a corner or along an edge, can also aid cover web removal, i.e. in "crack-peel" manner.

Continuous production can be by thermoforming two sheets or webs in one machine, but preformed parts could be used, or a combination. Feasibly, product can be loaded into the inner part alone and a top web sealed over before inserting the loaded inner part into the outer part.

In one suitable apparatus, web materials for inner and outer parts are held together, at least up to sealing thereto of a cover, conveniently by a chain conveyor which grips opposite overlying edge portions. Covering webs impermeable to gas, vapour, aroma or flavouring are generally preferred for food packs, and may be of clear or opaque or printed material, normally polymeric.

In connection with applying and/or sealing the covering web, the inner part may be gas flushed, or gas introduced where a controlled or modified atmosphere is called for in the head space between the inner part and the covering web, and at least the inner part may exhibit controlled permeation properties, say where the space between the inner and outer parts also contains an atmosphere helpful in conjunction with or relative to the head space atmosphere.

Specific implementation of the present invention will now be described, by way of example, with reference to the accompanying drawings; in which.

Figure 1:
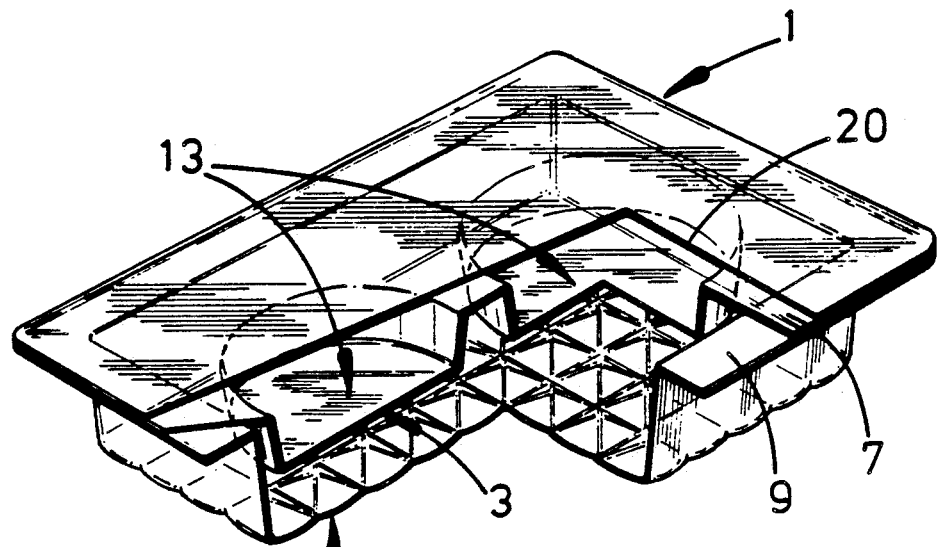
FIG. 1 is a broken away perspective view of a container for food according to the present invention.

A container for food, generally indicated at 1, has inner and outer parts 3 and 5, respectively, the inner part 3 having wells 13 accommodated substantially within a well space 11 of the outer part 5. The parts are in the form of open-top trays, as illustrated and each has a peripheral flange 7, 9. The flange 7 of the inner part 3 overlaps and contacts the flange 9 of the outer part 5 so as to support the part 3. The wells 13 are then accommodated within the outer part well space 11 and spaced therefrom all-round in that space 11. Different materials are usual for the parts 3 and 5.

One of the parts 3 and 5, which can be preformed to shape, can be physically robust, basically substantially rigid and form-sustaining in ovens, and the other can be physically weaker, even flexible, although that is by no means essential. It is, however, preferred that the inner part have characteristics against contamination and loss of desired atmosphere, say an anti-contaninant material impermeable to controlled/modified atmospheres. We are particularly interested in the use of plastics/polymeric materials that can be shaped by the techniques of thermoforming using differential pressures.

The gap all-round between the two parts 3 and 5 can be particularly advantageous as a thermal barrier insulation feature, or as a shock/impact protection.

Figure 2:
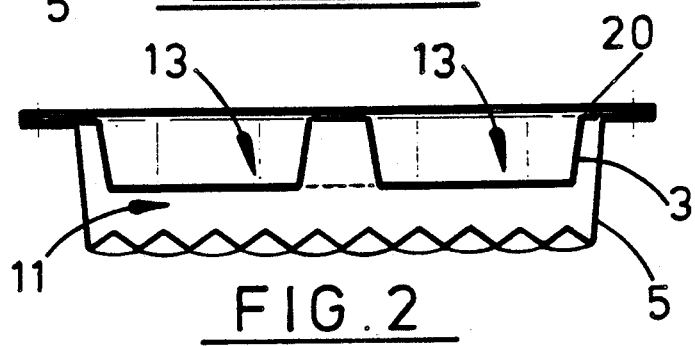
FIG. 2 is a schematic sectional view of the container.

In FIG. 1, the inner part 3 has two wells 13, although a single well may be more usual (as shown dotted in FIG. 2.)

In one application, suitable for use in a microwave oven, the inner part 3 is formed of a flexible web of material which is capable of withstanding the cooking temperatures generated in food products, typically up to 120 degrees C. A suitable material is a coextruded multilayer film of polyethylene/adhesive/nylon/adhesive/polyethylene with a thickness of say 50–100 microns. The outer part 5 can be made of a material which has a lower resistance to thermal distortion, which may be as low as 50 or 60 degrees C. A suitable material is a multilayer base web of styrene/adhesive/polyethylene extruded together say with a web thickness of 500 microns.

In practice, the temperature of the outer part 5 is usually such that it can be held in the hand comfortably, even whilst the inner skin contains product at boiling point i.e. in excess of 100 degrees C.

Use of a high grade, relatively expensive, barrier material (e.g. non-contaninant and gas impermeable) for the inner part 3 need not contribute significantly to physical robustness, thought the outer part 5 can do so, and be of a much less expensive material whose non-contaminant nature is less important, and may even be gas permeable. The barrier materials should act to block any gas, flavour, aroma and vapour permeation.

In another embodiment, for use in a conventional oven, the outer part 5 is of a material which will withstand oven-shelf contact-temperatures of 200–220 degrees C., whilst the gap 11 allows the inner part 3 to be made of a material which needs only to withstand the temperature of the food, typically 120 degrees C. since the food acts as a heat sink. In this case, for economy, it may be preferred to form the inner part 3 from a physically strong or robust material, and to have the outer part 5 of a weaker, even flexible, material. A suitable material for the inner part is a polypropylene/adhesive/nylon/adhesive/polypropylene laminate, say of 500 microns thickness. A suitable material for the outer part is a thin flexible polycarbonate/sealant web with a thickness of 50–100 microns. Gas pressure between the inner and outer parts can inflate a flexible outer part and assure spacing it from the inner part, typically by heat generated in the cooking process expanding gas in the gap 11, so ensuring spacing of inner and outer parts. It can be advantageous for shapes of the parts and amount of gas within the gap 11 to be such that the outer part inflates just sufficiently on heating. Ridges or dimples in the inner part can be employed, say relative to a plain outer part.

In producing a packaged food product, usually there will be sealing of the inner and outer parts 3, 5 together continuously about their peripheral flangings 7, 9, whether before or at sealing on a top cover 20.

Figure 3:
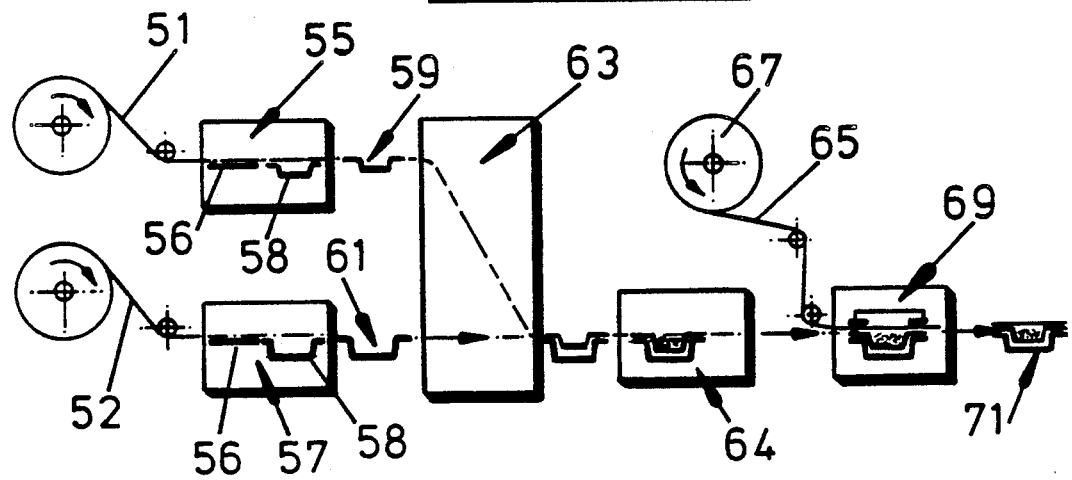
FIG. 3 is a diagrammatic illustration showing the various parts of a machine and illustrating the stages in a method of producing a food package.

In one method of manufacture, see FIG. 3, two webs of material 51, 52 are fed into respective thermoforming units 55, 57 to form inner parts 59 from web 51 and outer parts 61 from web 52. Typically, each thermoforming unit 55, 57 comprises a heater 56 to heat up a web urged against it and render the web deformable, and a mould 58 to which heated web is indexed and where differential pressure urges it into contact with the mould 58. The formed shape will be retained on cooling. The plate 56 and mould 58 may move up and down during indexing of the web. After thermoforming, the two formed webs are brought together at a combining stage 63 so that inner parts 59 are inserted into respective outer parts 61 of tray-like form.

The assembled parts then pass to a product loading station 64. Conveyance may be by pairs of chain conveyors or the like (not illustrated) engaging overlying edge flanges of the two formed webs. A conveyor with spring-loaded side-engagers for gripping edges of the web 52 can also pick up the web 51 at the station 63, and may serve to pull both webs off and through thermoforming, etc. However, a separate conveyor section may be employed for transporting the web of the inner part through its thermoforming unit.

Figure 7:
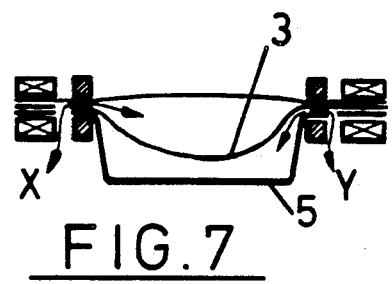
FIG. 7 illustrates diagrammatically provisions for allowing passage of gas to and from both sides of inner parts.

The product loading station is followed by a sealing station applying a covering web 65 unwound from a reel 67 over the open top of the container. This is likewise preferably drawn through by said first conveyor. Mechanical means can be used to hold the covering web and two parts as required whilst the compartment accommodating the product, at least if food, is gas flushed where desired before sealing of the covering web in position, usually by heat. All required evacuation and gas flushing is preferably done at the sealing station. Thus, unwanted distortion of the inner parts can be assured by reduction of pressure in the space between the inner and outer parts. Flushing of that space could use different gases from those for the product compartment. FIG. 7 illustrates diagrammatically provisions for allowing evacuation to both sides of the inner skin 3 and/or introduction of any desired atmosphere prior to final sealing, for which purpose the webs of the inner and outer skins are pierced so as to align with respective passages are represented by respective arrows X and Y leading to spaces above and below the inner part. Webs are then severed to give complete packages 71.

Spaced skin containers made as herein described can be useful for products other than food, whether as packaging for transportation, including shock/vibration resistance, or for display, say using transparent material at least for covers.

Figure 4:
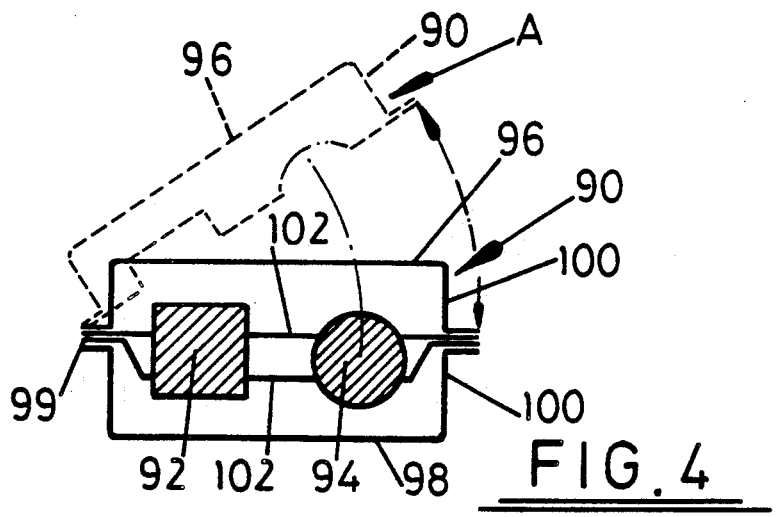
FIG. 4 is a simplified sectional view through a container providing protection against physical damage to product therewithin.

FIG. 4 shows a spaced skin container 90 that suspends and restrains a product or products 92, 94 with a considerable degree of protection from impact shock and/or vibration. That may be done by a contacting cover web or, as illustrated by a clam-shell type container with top and bottom components 96, 98 formed as above and hinged along one edge 99. The top is shown hinged apart in dotted outline at A. Each component has an outer part 100, usually this would be made of a relatively rigid material, and an inner part 102 both possibly transparent.

The two components 96, 98 can be separate spaced skin containers brought together and secured in any convenient way. Alternatively, a continuous series of alternating components 92, 94 can be severed in end-to-end pairs. Multiple formation with the components side-by-side can also be produced and, at least then, adjacent formations for top and bottom can readily be formed with different desired well shapes.

Figure 5:
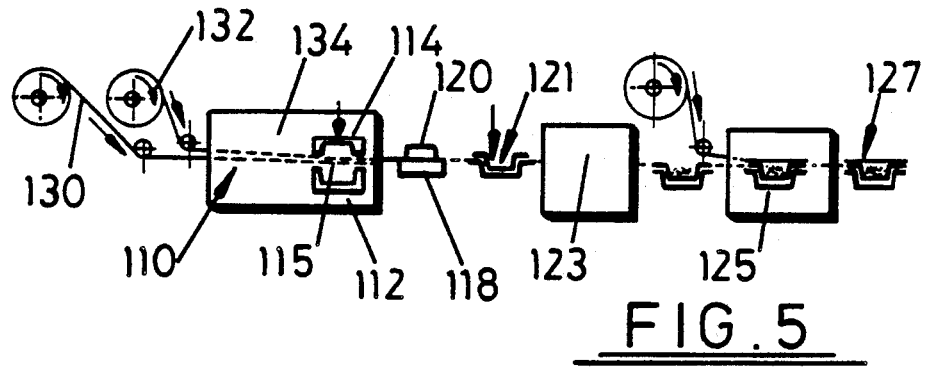
FIG. 5 is a schematic view of the process of forming a container with material of inner and outer parts brought together before formation.

FIG. 5 shows simultaneous formation of inner and outer parts from webs 130, 132 fed together into a forming machine 134 in overlying relation, preferably with slight separation into which pressurised gas may be fed. The webs are moved simultaneously to a heating and forming station 110 where both webs are heated, then the webs are indexed and thermoformed. There are two moulds, one (112) for the outer web, conveniently as a female mould, and the other (114) also as a female mould for the inner web. Pressure applied between the webs, such as from pipe 115, can help the webs to conform to the shape of the respective moulds, usually in conjunction with vacuum applied to interiors of the moulds. The webs preferably cool on contact with surfaces of the moulds.

Bringing the overlying peripheral edge portions of the webs together, say after initial shaping of inner and outer parts, whilst still in the mould, can serve in joining the two webs at their edges. Where a flexible material is used for the inner part, it can be inverted after formation, shown at 121, either by application of pressure (mechanical or fluid) or at introducing product.

Figure 8:
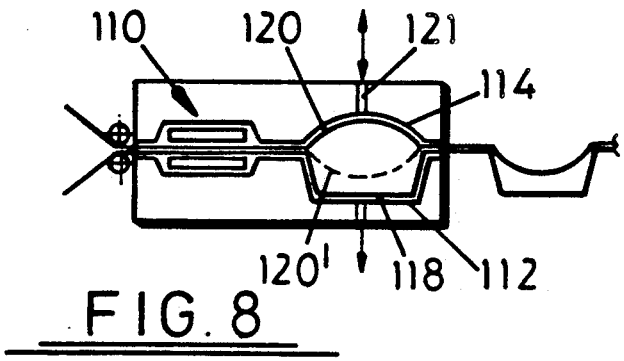
FIG. 8 illustrates reversal of inner parts within the thermoforming station.

Perhaps preferably, such inversion can be done in the mould by the introduction of pressure between the part 120 and its mould 114, see dashed arrow in FIG. 5, and FIG. 8 where the inner part is shown solid at 120 in the forming position, and chain dotted at 120 in its reversed position ready for introducing of product. Gas pressure input by way of passageway 121 can serve to invert the part.

The so-formed spaced-skin component then moves to successive stations in the machine (unless producing simple product container parts for later filling), see filling station 123, top web applying and sealing station 125, and severing station 127. Any desired atmosphere may be established in the final package, whether in the head space above the product or between the inner and outer skins. The inner and outer parts can be apertured to allow evacuation and/or gas flushing and/or atmosphere introduction as illustrated with reference to FIG. 7.

Figure 6:
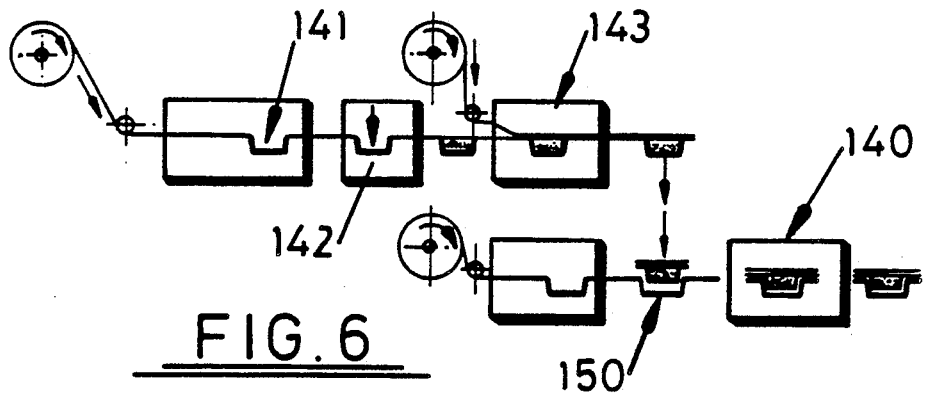
FIG. 6 is a schematic view of another system forming filled containers.

FIG. 6 shows a further alternative for manufacture. There, the inner and outer parts are brought together after the inner part has been filled, even, as shown, after the filled inner part has been covered. The outer part can then be sealed to the filled inner part at station 140. Inner part web thermoforming is shown at 141 progressing to a filling station at 142 with a covering web then being sealed to the filled container at 143. The filled container may be gas flushed prior to final sealing. This is followed by bringing together with the thermoformed outer part 150, preferably after the filled inner part is severed from its web, indeed the filling may take place completely separately e.g. at a remote location from the final combination with the outer web. Alternatively, positioning and sealing of the cover can be done after bringing together the filled inner part with the outer part so that one sealing operation can suffice to seal all three webs. The other stations can be as described previously.

By use of suitable web formations the top web can provide a peelable seal with the inner web. More especially, with all three webs sealed together, we propose to cut through the inner and outer webs, say across a corner flange of the package, to provide a crack-peel system.

In the foregoing, we describe use of a barrier material for the inner part, and refer to it being chosen for its impermeability. It will be appreciated that many, if not all, so-called impermeable materials do possess some permeability, even if very low. Moreover, it is foreseen that advantage can arise from using a inner part material that has an intentional desired permeability, for example in exchange of gases through the inner part.

Moreover, containers hereof can be shaped as desired, including deeper, say for drinks or soups etc., even triangular say for sandwiches etc. Presence of a fluid, usually a gas but possibly a liquid, between the inner and outer parts is a significant aspect of invention contributing to advantageous combinations of heat insulation and physical cushioning, especially for microwavable food products.

We claim:

1. A self supporting product container comprising an inner dished part formed with a peripheral edge portion thereabout and a first well for receiving said product, and an outer dished part formed with a peripheral edge portion thereabout and a second well into which said first well is entrant, the inner and outer parts contacting and being joined to each other at their respective peripheral edge portions, otherwise with their wells in all-round mutually-spaced relation and wherein the inner and outer dished parts are made each from a different thermoformable plastic material, said materials being selected such that one dished part has a higher resistance to thermal deformation than the other.

2. A self supporting product container as claimed in claim 1, in which the peripheral edge portions of the inner and outer parts are joined together by a continuous seal thereabout.

3. A self supporting product container as claimed in claim 1 in which the space between the inner and outer parts is occupied by a fluid with insulating/cushioning properties.

4. A container as claimed in claim 1 further comprising a cover for the product-receiving well.

5. A container as claimed in claim 4 in which the cover is separable by build up of pressure in the product receiving well.

6. A container as claimed in claim 4, in which the cover is a web or film sealed over the peripheral edge portion of the inner part.

7. A container as claimed in claim 6, in which the cover and the product-receiving well cooperate for close restraint product.

8. A container as claimed in claim 1, having desired atmosphere in at least the product-receiving well.

9. A container as claimed in preceding claim 1, for food, in which its constituent materials are microwavable and the outer part affords physical supporting properties, and the inner part affords non-contaminating barrier properties and has higher thermal deformation resistance than the outer part.

10. A container as claimed in claim 1, for food, in which the inner and outer parts have thermal deformation resistance properties permitting use of the container in a conventional oven for cooking purposes, the thermal deformation resistance of the outer part being higher than that of the inner part.

* * * * *

UNITED STATES PATENT AND TRADEMARK OFFICE
CERTIFICATE OF CORRECTION

PATENT NO. : 4,994,638

DATED : February 19, 1991

INVENTOR(S) : David S. Iorns, David S. Bruce, Hans-Joachim Biskup, and Erhard Scheibel It is certified that error appears in the above-identified patent and that said Letters Patent is hereby corrected as shown below:

Front page, in the Foreign Application Priority Data:

line 1, delete [(DE) Fed. Republic of Germany] insert (UK) United Kingdom;

line 2, delete [(DE) Fed. Republic of Germany] insert (UK) United Kingdom.

Signed and Sealed this

Fourteenth Day of July, 1992

*Attest:*

DOUGLAS B. COMER

*Attesting Officer*         *Acting Commissioner of Patents and Trademarks*